United States Patent [19]  [11]  4,362,675
Shannon  [45]  Dec. 7, 1982

[54] METHOD OF DELAYING HARDENING OF INORGANIC BINDERS

[75] Inventor: Richard F. Shannon, Lancaster, Ohio

[73] Assignee: Owens-Corning Fiberglas Corporation, Toledo, Ohio

[21] Appl. No.: 228,409

[22] Filed: Jan. 26, 1981

Related U.S. Application Data

[63] Continuation of Ser. No. 51,641, Jun. 25, 1979, abandoned.

[51] Int. Cl.³ ............................................. B05B 3/00
[52] U.S. Cl. ................................. 264/28; 264/237; 264/333; 264/348
[58] Field of Search ................ 264/28, 237, 333, 348; 156/39, 44, 45

[56] References Cited

U.S. PATENT DOCUMENTS 3,813,460  5/1974  Tardieu ............................... 264/28
3,974,247  8/1976  Tardieu ............................... 264/28
4,099,337  7/1978  Wauhop, Jr. ......................... 264/82
4,127,628  11/1978  Uchida et al. ...................... 264/333

OTHER PUBLICATIONS

Lea, F. M. and Desch, C. H. "The Chemistry of Cement and Concrete" 2nd ed. 1956, pp. 249-250.
Lea, F. M. "The Chemistry of Cement and Concrete" 3rd ed. 1970, p. 299.

Primary Examiner—Donald E. Czaja
Assistant Examiner—W. Thompson
Attorney, Agent, or Firm—Ronald C. Hudgens; Robert F. Rywalski; William P. Hickey

[57] ABSTRACT

A method of postponing the set of inorganic binders which set by hydration and wherein the cements are mixed with water and frozen before the green set takes place. Preferably the freezing is done before two thirds of the normal time to set under the temperature and other conditions which occur at the time that the materials are fully mixed.

11 Claims, 5 Drawing Figures

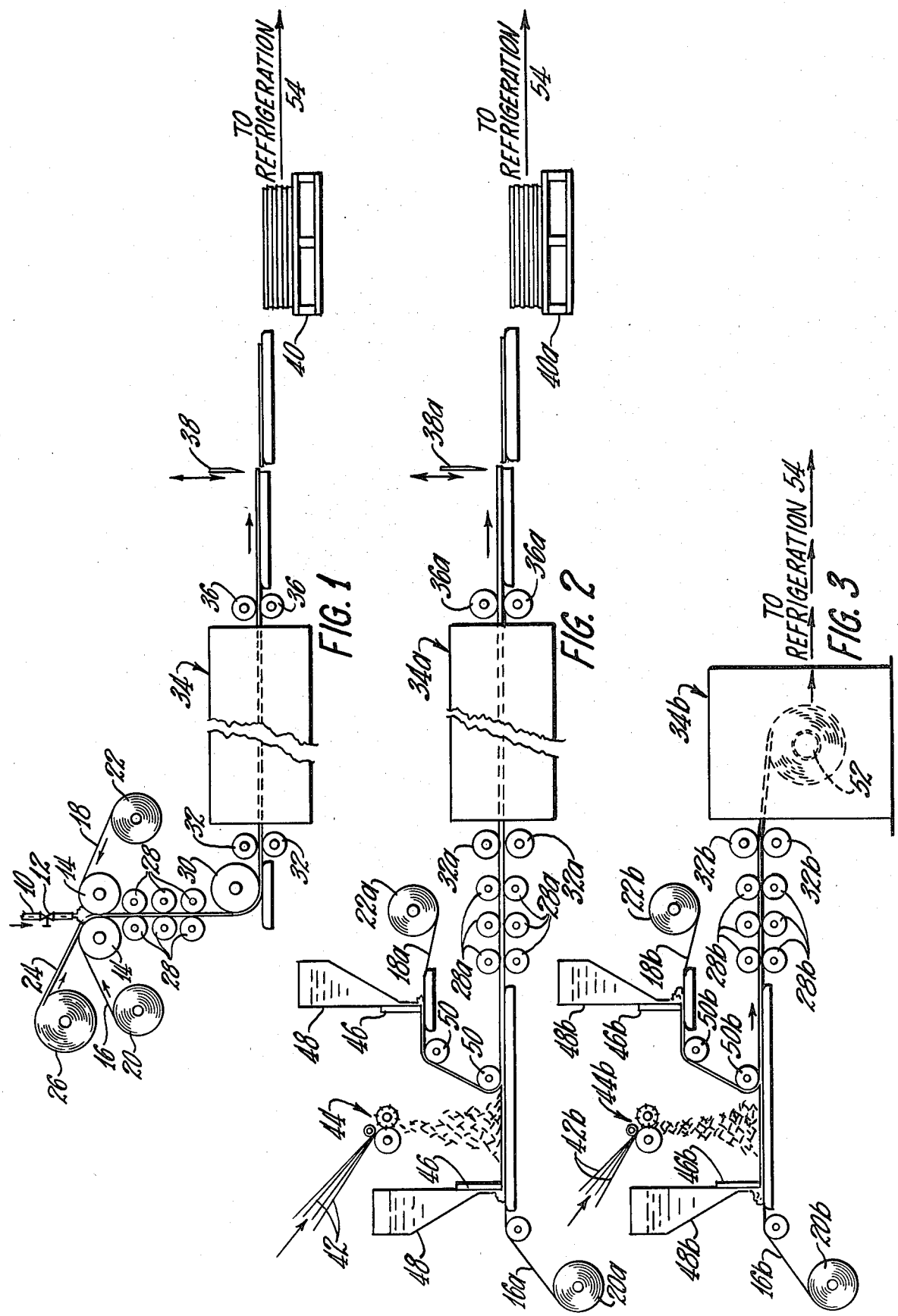

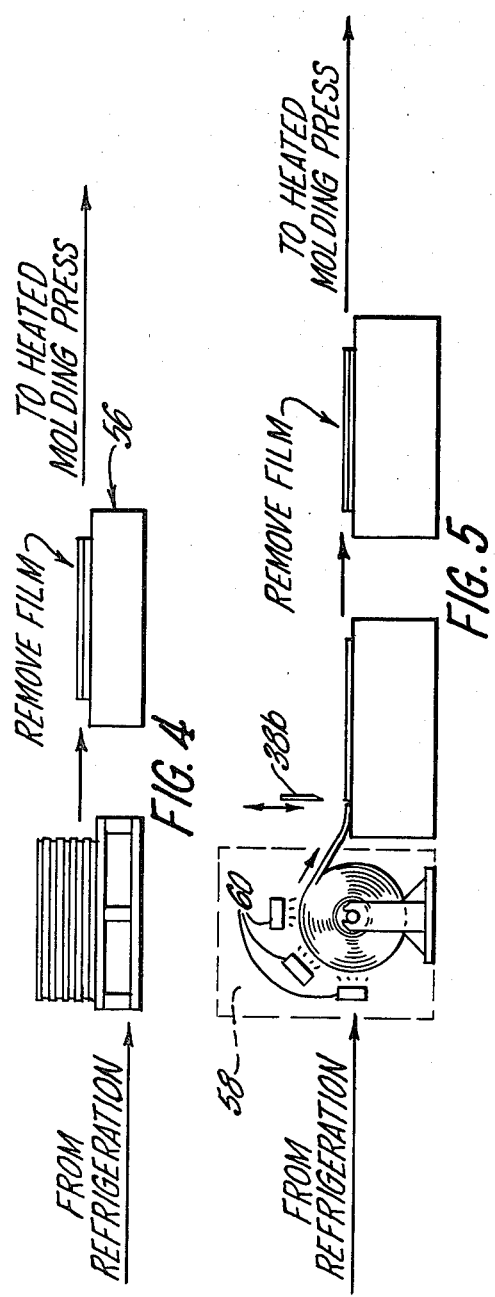

METHOD OF DELAYING HARDENING OF INORGANIC BINDERS

This is a continuation of application Ser. No. 51,641, filed June 25, 1979, now abandoned.

TECHNICAL FIELD

The present invention relates to new and improved processes for producing molded or cast parts from slurries containing hydratable inorganic binders.

BACKGROUND OF THE INVENTION

Inorganic binders for molding and/or casting compounds have the advantage over organic binders in that they are fire resistant. Obviously inorganic binders do not contribute fuel or produce smoke when they are subjected to fire, and in the case of hydrates, undergo dehydration to provide a cooling effect which makes the hydrates good fire proofing materials.

A number of inorganic binder systems have been known to be capable of producing moldable or castable materials in that they have suitable strengths and can be caused to set up in molds in setting times comparable to the setting times of organic resins. Most of the inorganic materials which are candidates for molding compounds involve hydration with water during the setting process. One of the principal reasons, however, why such inorganic materials have never had the acceptance that organic resins have had for binders is that there has been no acceptable way for preventing the setting process from going to completion once water is added to the cement. In the case of organic resins, such as the phenolics, polyesters, epoxys, polyurethanes, etc., the setting of the organic resin is accomplished in two stages. The first stage may utilize one polymerization mechanism, while the second stage employs a different polymerization mechanism. Such control in organic systems is well known but does not exist with hydratable inorganic binders.

An object of the present invention is the provision of a new and improved process for making molded or cast parts of hydratable inorganic binders, which process will permit extended periods of time to occur between the time that the moldable or castable compound is made and the molded or cast parts are produced.

A still further object of the present invention is the provision of new and improved forms of molding compounds having hydratable inorganic binders.

Further objects and advantages of the invention will become apparent to those skilled in the art to which the invention relates from the following disclosure of applicant's preferred embodiments.

BRIEF DESCRIPTION OF THE DRAWINGS

FIG. 1 is a schematic view of a process for producing inexpensive molding compounds that are stored for extended periods of time before molding from a compound having a hydratable inorganic binder.

FIG. 2 is a schematic view of another method of producing and storing sheet molding compounds that have inorganic binders for extended periods of time.

FIG. 3 is a schematic view, similar to FIG. 2, but showing still another method of storing sheet molding compounds.

FIG. 4 is a schematic view showing a process for molding sheet molding compounds as produced by the processes of FIGS. 1 and 2.

FIG. 5 is a schematic view of another specifically designed process to produce molded parts from the sheet molding compound produced by the process of FIG. 3.

DESCRIPTION OF THE PREFERRED EMBODIMENTS

As previously explained, the advantages of molding compounds having hydratable inorganic materials have been known for a long time, but prior to the present invention, there has been no commercially feasible process of producing molded parts from such materials. Obviously, delays occur from time to time in any commercial process. No one has ever, to my knowledge, been able to significantly delay the setting of inorganic binders more than a few hours by chemical or other means once they are prepared without impairing their strength to some degree. Obviously, any delay in using compounds made with inorganic binders, once they are mixed, will cause the material to either set up in the equipment, or require the compound to be dumped, if the situation is caught in time. Obviously the requirement of dumping the molding compound when delays occur, make such processes too costly for high production, molding or casting operations.

According to principles of the present invention, I have discovered that aqueous slurries of hydratable inorganic binders can be stored, prior to hardening, almost indefinitely without harming the ability of the slurries to make an acceptable finished product, if the slurries are frozen before they have hydrated to a gel like structure, commonly referred to as the "green set" stage. I have found that as long as the mixtures are maintained in a frozen condition, the setting process can be significantly arrested without adversely affecting completion of the hydration at a later time. The temperature at which the compounds must be kept may vary, from one material to the other, depending upon the type and concentration of salts that become dissolved in the water of the slurry. It is well known that the freezing of Portland cement slurries during the hydration process will greatly reduce the strength of the subsequently formed concrete. I have found, however, that if the freezing takes place at a stage before a significant percentage of crystalline growth has been completed, no significant harm is done.

The present invention, as visioned by the inventor, has its greatest utility in the process of making molded parts from materials that include hydratable inorganic binders that have a relatively short setting time, such as gypsum, and the "mag-oxy" cements that are the reaction products of magnesia and magnesium salts such as, magnesium oxysulfate, magnesium oxychloride, magnesium oxyphosphates etc. The invention will have utility with still other materials, as will occur to those skilled in the art from the following description of the invention, including the following examples:

EXAMPLE 1

A magnesium oxychloride forming slurry is made from the following materials:

| Materials | Parts by Weight |
| --- | --- |
| MgO | 210 |
| $MgCl_2.6H_2O$ | 180 |
| Sodium hexametaphosphate | 1 |
| Phosphoric acid | 3 |

| Materials | Parts by Weight |
|---|---|
| Water | 77 |

The magnesium chloride salt, sodium hexametaphosphate and phosphoric acid are dissolved in the water, and the magnesium oxide is then added and thoroughly mixed. The temperature during mixing is not allowed to exceed 35° C., and the final slurry is immediately cooled after mixing to 20° C.

A sheet molding compound is made from the slurry by the process shown in FIG. 1. The slurry is pumped by pipe 10 through a control valve shown schematically at 12 to the nip of compression rolls 14. A pair of separation sheets 16 and 18 are fed from respective rolls 20 and 22 over the top of the compression roll 14 to receive the slurry therebetween. A layer of continuous glass strand swirl mat 24 is fed between the separation sheets 16 and 18 from a roll 26, so that the slurry is forced into the interstices of the mat. The sandwich formed by the separation sheets, glass strand mat and slurry passes from the compression roll 14 downwardly through the nips of a plurality of pairs of kneading rolls 28 having ridges and valleys which knead or move the slurry from side to side through the mat to wet out the fibers. The sandwich is then fed under a direction changing roll 30 through the nip of a pair of pull rolls 32 which then discharges the sandwich to a freezer 34 maintained at a temperature of −40° C. The sandwich assumes a board-like character, and is then passed through the nip of another pair of pull rolls 36 which feed the frozen sheet molding compound to a shear shown schematically at 38, which cuts the frozen sheet molding compound into sections of uniform length. The sections of sheet molding compound are stacked on a pallet 40 which when full is moved to a refrigerated room that is maintained at 31 40° C.

Alternatively, the slurry may be formed into a sheet molding compound using the procedure shown in FIG. 2. Those portions of the process shown in FIG. 2 which are similar to those shown in FIG. 1 are designated by a like reference numeral characterized further in that a subscript "a" is affixed thereto. The process shown in FIG. 2 differs principally from the process shown in FIG. 1 in that the glass strand mat is replaced by chopped glass fibers—the chopping operation for which requires that the chopped fibers fall upon a moving horizontal surface. The glass strand indicated at 42 is passed through a conventional chopper 44. Chopped lengths of the strand fall downwardly upon a separation sheet 16a having a layer of the slurry thereon as produced by a doctor blade 46. The slurry is fed to the doctor blade from a spreader tank 48. Similarly, another layer of the slurry is fed to a separation sheet 18a which passes over direction changing rolls 50 to bring the separation sheet 18a with the slurry thereon down on top of the chopped fibers to form a sandwich. Thereafter, the sandwich is processed in a manner similar to that shown in FIG. 1.

Alternatively, the sheet molding compound can be made by the process shown in FIG. 3. The process shown in FIG. 3 is generally the same as that shown in FIG. 2, excepting that the sandwich after passing from the kneading rolls 28b is rolled up on a mandril 52, located in the freezer 34b. The portions of apparatus shown in FIG. 3 which correspond to those shown in FIG. 2, are designated by the same reference number, excepting that a suffix "b" is affixed thereto.

The sheet molding compound made as above described can be stored indefinitely at −40° C. When it is desired to produce products from the sheet molding compound, the sheets are removed from the refrigerator 54 to an area adjacent the molding press where the sheets are allowed to thaw as shown in FIG. 4. If the sheet molding compound is kept below approximately 10° C., a period exists before it is necessary to place it in the molding press. The sheet molding compound is moved to a station 56 where the separation sheets are removed, and the sheet molding compound is then fed to a heated molding press. Sufficient pressure is used to close the mold against stops, and the sheets are molded at a temperature of at least 90° C. for four minutes.

If the sheet molding compound was coiled into a roll as is shown in FIG. 3, the coil of sheet molding compound is moved to a thawing room 58 where a plurality of infrared heaters 60 direct heat down upon the outer surface of the roll to soften the outer coil. The outer coil is then straightened and fed to the shear 38b which cuts the sheet molding compound into proper lengths for feeding into the molding press above described.

EXAMPLE 2

The process of Example 1 is repeated using a magnesiumoxysulfate forming slurry, made of the following materials:

| Materials | Parts by Weight |
|---|---|
| CaCO$_3$ | 153 |
| MgSO$_4$.7H$_2$O | 152 |
| MgO | 305 |
| Water | 305 |

EXAMPLE 3

The process of Example 1 is repeated to provide molded parts having good weathering properties. The slurry from which the molding compound is made is basically a magnesium oxychloride forming material but includes colloidal silica.

| Ingredients | Parts by Weight |
|---|---|
| MgO | 120 |
| MgCl$_2$.6H$_2$O | 100 |
| Colloidal Silica (40% solids) | 100 |
| Silica flour (−100 mesh) | 100 |
| Water | 130 |

EXAMPLE 4

The process of Example 1 is repeated using a slurry which forms a combination inorganic and organic binder.

| Ingredients | Parts by Weight |
|---|---|
| Calcined gypsum | 100 |
| Urea formaldehyde solution (66% solids in water) | 42 |
| Retarder - keratin | 0.25 |
| Zinc stearate | 1.0 |
| Sodium chloride | 0.5 |
| Tartaric acid | 0.5 |
| Water | 3.0 |

The sheet molding compound that is made can be stored indefinitely when kept frozen and when molded, and produces parts having good strength in the as molded condition. The gypsum improves the fire resistance of the inorganic binder.

As previously indicated, the time by which the hydrating slurry must be frozen is critical. It appears that the amount of water of crystallization that is added during hydration increases to a definite amount and stops, and in the case of one form of magoxy cement, this is reported to be eight molecules of water in the case of the magoxysulfate and nine molecules of water in the case of the magoxychloride. It appears that once these amounts of water have been taken into the molecule and the crystal is broken, the bond will not later reunite. If however, only a partial hydration has occured at the time the material is frozen, then it can take on the remaining molecules of water necessary to form the crystalline hydrate after thawing to give substantially its full strength.

As a practical matter it becomes highly desirable to complete the steps in applicant's process by certain times, if the freezing of the slurry is not to substantially affect the final strength of the product. Because these times vary with the amounts of inhibitor used and the temperature at which the slurries are processed before and after freezing, these times are best expressed as a percentage or fraction of the "normal time to set" or "green set time" for the slurry mixture envolved at the temperature used during mixing and after thawing. It has been worked out that the slurries should be frozen as soon as practical after mixing and preferably before two thirds of the time to set, in order for the remainder of the process to be carried out in time to avoid damage. After thawing, the process of setting up starts up again and the thawed slurry is preferably poured or molded into its final shape and left to set before an additional 1/12 of the time expires or before 5/6ths of the time to set has elapsed.

Because the water in the slurries envolved certain salts which depress their freezing temperature, and because the solutions become more concentrated as ice separates out the materials are preferably kept frozen at temperatures below $-10°$ C., and preferably below $-30°$ C. During mixing of the cement forming material with water, heat is usually given off and the slurries are preferably prepared and held at temperatures between $1°$ C. and $20°$ C. before freezing.

In the case of the "magoxy cements", the strength of the hydrate formed falls off dramatically when it is formed out of a slurry having less than about 25% solids initially. At solids levels of above about 75%, the slurries are two unflowable to shape properly. The magoxy cement forming slurries therefore will preferably be between 25% and 75% solids. No such problem occurs with gypsum, Portland cement, and high alumina cements.

It has further been found, that if a slurry has taken on some green set or rigidity, but has not completely hardened, the material can be recycled through the mixing operation with fresh reactants and it will again set up to produce a product having most of the strength of a fresh product. In the case of magoxy cements, both MgO and the magnesium salt should be added in the molar proportions to produce the hydrate. It appears that the set material has more reactivity than that of an inert filler, and that therefore this is a desirable method of reclaiming green set material. This is particularly true where the materials are molded under heat and pressure.

While the invention has been described in considerable detail, I do not want to be limited to the particular embodiments shown and described, and it is my intention to cover hereby all adaptations, modifications, and arrangements thereof which come within the scope of the following claims.

I claim:

1. A method of making rigid articles from cements containing the hydrated reaction products of magnesia and a magnesium salt, said method comprising: mixing magnesium salt, water and magnesia with or without inhibitors to form a slurry having a solids ratio from between 25% and 75% at a temperature between approximately $1°$ C. and approximately $20°$ C. and at which temperature the slurry will have a normal period of time before set; subjecting the mixture to a temperature below approximately $-20°$ C. during approximately the first two thirds of said normal period of time before set to freeze the water of the slurry, storing the mixture in a frozen condition for a period of time, thawing the frozen mixture, and molding the partially set mixture using sufficient pressure to reshape the partially set mixture into the final shape of the desired rigid article before five-sixths of said normal period of time before set occurs.

2. A method of making fiber reinforced rigid articles having a binder of a hydrate of the reaction product of magnesia and a magnesium salt, said method comprising: preparing a slurry of magnesia, water, a reactive magnesium salt, with or without fillers and inhibitors to provide a slurry having a normal time to set; mixing the slurry with fibers during the first half of the time to set to form a molding compound; freezing the molding compound before more than approximately two thirds of the time to set has elapsed to solidify the water; storing the frozen molding compound; thawing the frozen molding compound; and molding the molding compound under heat and pressure to a desired shape before approximately five sixths of the time to set has elapsed.

3. A method of making fiber reinforced rigid articles having a binder of a hydrate of the reaction product of magnesia and a magnesium salt, said method comprising: preparing a slurry of magnesia, water, a reactive magnesium salt, with or without fillers and inhibitors to provide a slurry having a normal time to set; mixing the slurry with fibers during the first half of the time to set; rolling the mixture into a sheet of predetermined thickness; freezing the sheet before more than approximately two thirds of the time to set has elapsed to solidify the water; storing the frozen sheet; thawing the frozen sheet; and molding the sheet under heat and pressure to a desired shape before approximately five sixths of the time to set has elapsed.

4. The method of claim 3 wherein said mixing step is accomplished by the impregnation of a mat of glass fibers.

5. The method of claim 3 wherein said sheet is rolled into a roll before freezing, and said thawing step is carried out before the unrolling of the sheet.

6. A method of making fiber reinforced rigid articles having a binder of gypsum, said method comprising: preparing a slurry of gypsum, cement and water, with or without fillers and inhibitors to provide a slurry having a normal time to set; mixing the slurry with fibers during the first half of the time to set; rolling the mixture into a sheet of predetermined thickness; freezing the sheet before more than approximately two thirds of the time to set has elapsed to solidify the water; storing the frozen sheet; thawing the frozen sheet; and molding the sheet under heat and pressure to a desired shape before approximately five sixths of the time to set has elapsed.

7. The method of claim 6 wherein said mixing step is accomplished by the impregnation of a mat of glass fibers.

8. The method of claim 6 wherein said sheet is rolled into a roll before freezing, and said thawing step is carried out before the unrolling of the sheet.

9. A method of making rigid articles having a magnesium oxide hydratable cement binder comprising: preparing an aqueous slurry of hydratable cement forming materials: allowing the slurry to take on a partial set; intimately mixing fresh magnesium oxide hydratable cement forming powder with the partially set material; and molding the intimately mixed materials under heat and pressure.

10. The method of claim 9 wherein the molding is done at a temperature above approximately 90° C.

11. A method of making rigid articles from inorganic molding compounds comprising a hydratable inorganic binder that has a relatively short setting time comparable to that of gypsum and the magnesium oxide cements, said method comprising: preparing a molding compound comprising water and said binder and which compound will have a normal time to set; freezing said molding compound before approximately two-thirds of said normal time to set has elapsed; storing the molding compound in a frozen condition for a period of time; thawing the molding compound; and molding the partially set molding compound using sufficient pressure to reshape the partially set molding compound into the final shape of the desired rigid article before five sixths of said normal period of time before set occurs to develop substantially the full strength of which said binder is capable.

* * * * *